(12) United States Patent
Jung

(10) Patent No.: US 12,019,582 B2
(45) Date of Patent: Jun. 25, 2024

(54) SYSTOLIC ARRAY DEVICE

(71) Applicant: SAPEON KOREA INC., Seongnam-si (KR)

(72) Inventor: Seung Rok Jung, Seoul (KR)

(73) Assignee: SAPEON KOREA INC., Seongnam-si (KR)

(*) Notice: Subject to any disclaimer, the term of this patent is extended or adjusted under 35 U.S.C. 154(b) by 141 days.

(21) Appl. No.: 17/569,081

(22) Filed: Jan. 5, 2022

(65) Prior Publication Data

US 2022/0129410 A1 Apr. 28, 2022

Related U.S. Application Data

(63) Continuation of application No. PCT/KR2020/009532, filed on Jul. 20, 2020.

(30) Foreign Application Priority Data

Jul. 18, 2019 (KR) .................. 10-2019-0087044

(51) Int. Cl.
*G06F 15/80* (2006.01)
*G06F 11/07* (2006.01)
*G06F 15/163* (2006.01)

(52) U.S. Cl.
CPC .......... *G06F 15/8046* (2013.01); *G06F 11/07* (2013.01); *G06F 15/163* (2013.01)

(58) Field of Classification Search
CPC .... G06F 15/8046; G06F 11/07; G06F 15/163; G06F 15/177
See application file for complete search history.

(56) References Cited

U.S. PATENT DOCUMENTS

| 2018/0267936 | A1 | 9/2018 | Chen et al. |
| 2019/0079801 | A1* | 3/2019 | Lyuh .................. G06F 15/8046 |
| 2019/0164037 | A1* | 5/2019 | Kim .......................... G06N 3/04 |

FOREIGN PATENT DOCUMENTS

| KR | 10-1998-0032544 A | 7/1998 |
| KR | 10-1999-0077600 A | 10/1999 |
| KR | 10-2019-0030564 A | 3/2019 |
| KR | 10-2019-0063393 A | 6/2019 |

OTHER PUBLICATIONS

Zhang et al.; Analyzing and Mitigating the Impact of Permanent Faults on a Systolic Array Based Neural Network Accelerator; 2018; IEEE (Year: 2018).*
Kim et al.; On the Design of Fault-Tolerant Two-Dimensional Systolic Arrays for Yield Enhancement; 1989; IEEE (Year: 1989).*

* cited by examiner

*Primary Examiner* — Corey S Faherty
(74) *Attorney, Agent, or Firm* — WTA Patents

(57) ABSTRACT

A systolic array device according an embodiment includes a plurality of processing units arranged in a matrix form of M by N (M and N are natural numbers). Each of the processing units includes: a processing element configured to perform a predetermined processing based on data received from a processing unit arranged adjacent to one side of the corresponding processing unit to output a result thereof; and a transfer part configured to perform one of an operation of transferring the received data to another processing unit arranged adjacent to the other side of the corresponding processing unit and an operation of transferring the result.

4 Claims, 13 Drawing Sheets

SYSTOLIC ARRAY DEVICE

TECHNICAL FIELD

The present disclosure relates to a systolic array device.

BACKGROUND ART

In a systolic array (SA) device, a plurality of processing elements (PEs) are adjacently arranged and connected with each other. Data such as an input feature and a partial sum are transferred between the adjacently arranged processing elements. At this time, the data may be transferred in a vertical direction or a horizontal direction. For example, the partial sum may be transferred in a vertical direction of SA (from the north to the south), and the input feature may be transferred in a horizontal direction (from the left to the right).

In SA, data such as the input feature is transferred between the adjacently arranged processing elements to be reused, thereby a bottleneck of the memory may not be caused. Further, in SA, the connection between the processing elements is short, thereby it is possible to embody the ASIC or the FPGA having relatively high clock frequency.

Meanwhile, a multiplier and an adder may be included in each of the plurality of processing elements included in SA, and each of the multiplier and the adder may be embodied by a plurality of transistors. If it is determined that any one of the transistors has a fault in a scan test performed after manufacturing a semiconductor, the entire chip die needs to be discarded. It is because the processing of the input feature and the output feature is performed by being engaged in a lock-step in the plurality of processing elements. Thus, there is a problem that the production yield is low. Accordingly, a way to solve this production yield problem is required.

SUMMARY

The problem to be solved in the present disclosure includes providing a way to utilize the SA without discarding the entire chip when the fault is found in the manufacturing process of the SA.

Meanwhile, the problem to be solved in the present disclosure is not limited to the description above. Another problem to be solved which was not described may be clearly understood to a person skilled in the art from the description below.

In accordance with an embodiment of the present disclosure, there is provided a systolic array device including: a plurality of processing units arranged in a matrix form of M by N (M and N are natural numbers), wherein each of the processing units includes: a processing element configured to perform a predetermined processing based on data received from a processing unit arranged adjacent to one side of the corresponding processing unit to output a result thereof; and a transfer part configured to perform one of an operation of transferring the received data to another processing unit arranged adjacent to the other side of the corresponding processing unit and an operation of transferring the result.

According to an embodiment of the present disclosure, even if there is a fault in a part of the processing units constituting the systolic array device, it is possible to reuse the systolic array device through a configuration of bypassing data in each of the processing units and a preliminarily provided processing unit, thereby it is possible to improve the production yield of the systolic array device.

DETAILED DESCRIPTION

The advantages and features of embodiments and methods of accomplishing these will be clearly understood from the following description taken in conjunction with the accompanying drawings. However, embodiments are not limited to those embodiments described, as embodiments may be implemented in various forms. It should be noted that the present embodiments are provided to make a full disclosure and also to allow those skilled in the art to know the full range of the embodiments. Therefore, the embodiments are to be defined only by the scope of the appended claims.

In describing the embodiments of the present disclosure, if it is determined that detailed description of related known components or functions unnecessarily obscures the gist of the present disclosure, the detailed description thereof will be omitted. Further, the terminologies to be described below are defined in consideration of functions of the embodiments of the present disclosure and may vary depending on a user's or an operator's intention or practice. Accordingly, the definition thereof may be made on a basis of the content throughout the specification.

Figure 1:
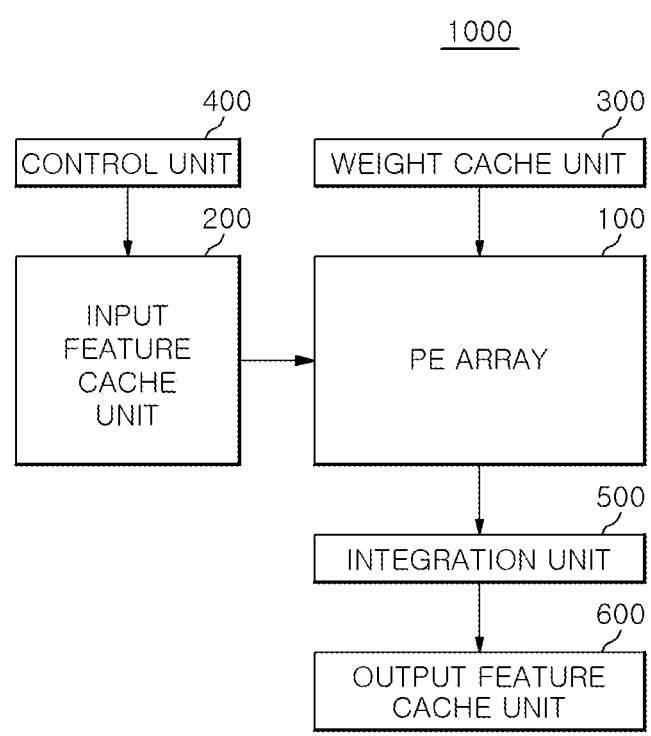
FIG. 1 is a schematic diagram illustrating a systolic array device according to a first embodiment of the present disclosure.

FIG. 1 is a block diagram illustrating a systolic array (SA) device 1000 according to a first embodiment of the present disclosure. The systolic array device 1000 may be utilized in various ways. For example, a processing accelerator is one of usable examples. Referring to FIG. 1, the systolic array device 1000 may include a processing element (PE) array 100, an input feature cache unit 200, a weight cache unit 300, a control unit 400, an integration unit 500, and an output feature cache unit 600. Each of the systolic array device 1000 and the components included in the systolic array device 1000 may be embodied by a memory for storing commands programmed to perform at the corresponding component and a microprocessor for executing the commands. However, the block diagram illustrated in FIG. 1 is an example, and thus, the systolic array device 1000 may not include at least one of the components illustrated in FIG. 1, or may include a component that is not illustrated in FIG. 1.

The input feature cache unit 200 may be embodied by a cache for storing an input feature. Here, the input feature may indicate information showing features such as a video or a voice, and so on.

The weight cache unit 300 may be embodied by a cache for storing a weight. Here, the weight is a type of kernel data, and indicates information that is multiplied to the input feature.

The processing element (PE) array 100 is configured to perform a processing by matching with a synchronizing signal (e.g., a clock signal). The processing element array 100 includes a plurality of processing units arranged in a matrix form of M by N (here, M and N are natural numbers). The processing unit itself will be described later.

Meanwhile, a part of the plurality of processing units are classified as main processing units and a remaining part are classified as preliminary processing units.

The main processing units may include at least two processing units, and the at least two processing units may be arranged in a matrix form of P by Q (here, P is a natural number equal to or smaller than M, Q is a natural number equal to or smaller than N, and the sum of P and Q is smaller than the sum of M and N).

The preliminary processing units indicate processing units having a form of at least one row or column added to the matrix form of P by Q formed by the mentioned main processing units. The preliminary processing units are provided to back up processing units having faults among the main processing units, which will be described later.

The control unit 400 may control the systolic array device 1000 to operate in various ways, for example, to operate as a processing accelerator, using information on the main processing units and the preliminary processing units. The operation of the control unit 400 will be described later.

The integration unit 500 may integrate a plurality of partial sums when the plurality of partial sums are provided, and may generate the integrated result as the output feature.

The output feature cache unit 600 may receive the output feature from the integration unit 500 and store the output feature.

Meanwhile, the systolic array device 1000 according to the first embodiment of the present disclosure may operate according to the original purpose even if there are faults in a part of the plurality of processing units included in the processing element array 100. Thus, a manufacturing yield of the systolic array device 1000 including the processing element array 100 may be improved. From now on, the specific configuration of the systolic array device 1000 that makes the above operation enable will be explained.

Figure 2:
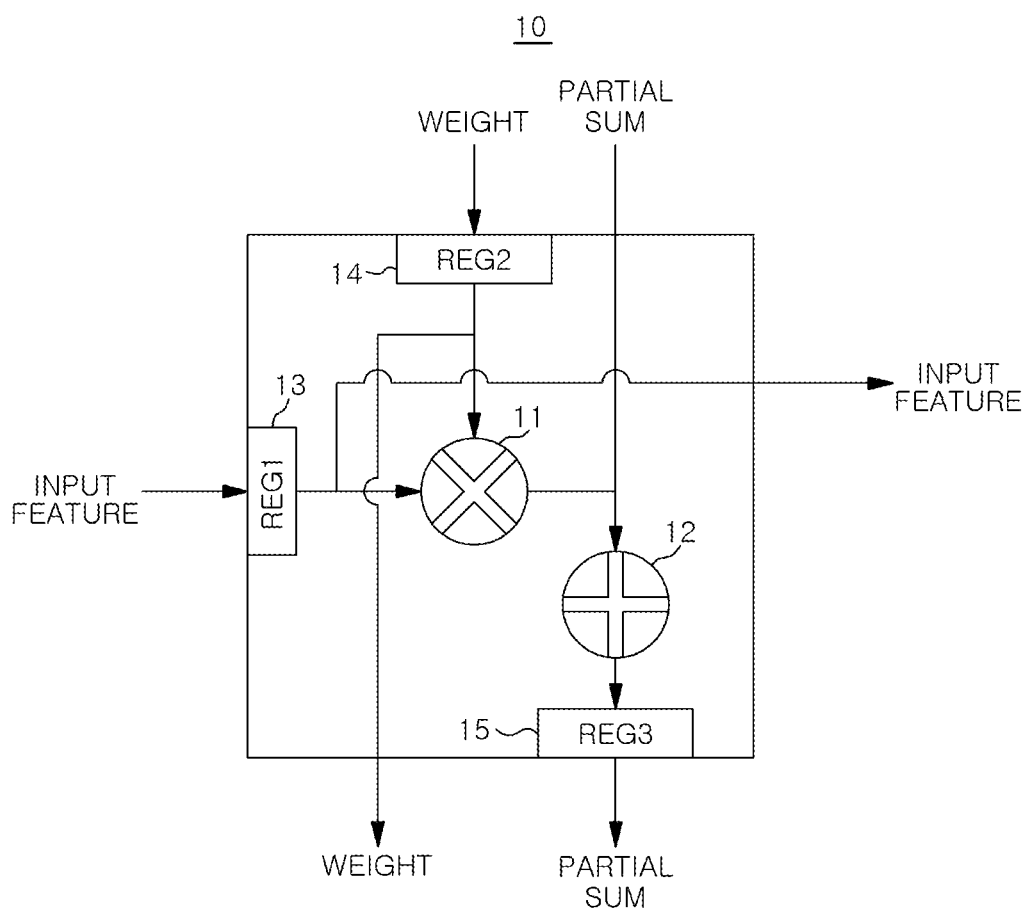
FIG. 2 is a schematic diagram illustrating a processing element (PE) applied in the first embodiment of the present disclosure.

The processing element array 100 included in the systolic array device 1000 may include the plurality of processing units as described above, and each of the processing units may include the processing element 10 according to the first embodiment of the present disclosure illustrated in FIG. 2.

More specifically, the processing element 10 may output a result by performing a predetermined processing based on a received data if data is received from a processing unit adjacently arranged on one side of itself. Here, 'itself' indicates a processing unit including the corresponding processing element 10. Further, 'data' may include the input feature, the weight, or the partial sum as mentioned.

More specifically, referring to FIG. 2, the processing element 10 may include REG1 13 which is a register for storing the input feature and REG2 14 which is a register for storing the weight. Further, the processing element 10 may include a multiplier 11 for multiplying the input feature and the weight. Also, the processing element 10 may include an adder 12, and in the adder 12, the partial sum transferred from the adjacently arranged processing unit and the multiplied result in the multiplier 11 may be added. Further, the processing element 10 may include REG3 15 which is a register for storing the added result in the adder 12.

Meanwhile, the processing element 10 may include a withdrawal route for bypassing information stored in each of the REG1 13, the REG2 14 and the REG3 15 to the processing unit adjacently arranged on the other side of itself. Meanwhile, if the processing element 10 has a fault, in some cases, the information stored in each of the REG1 13, the REG2 14 and the REG3 15 may not be bypassed outside. Here, having the 'fault' may mean that there is an abnormality in the component included in the processing element 10 or in the route.

Figure 3:
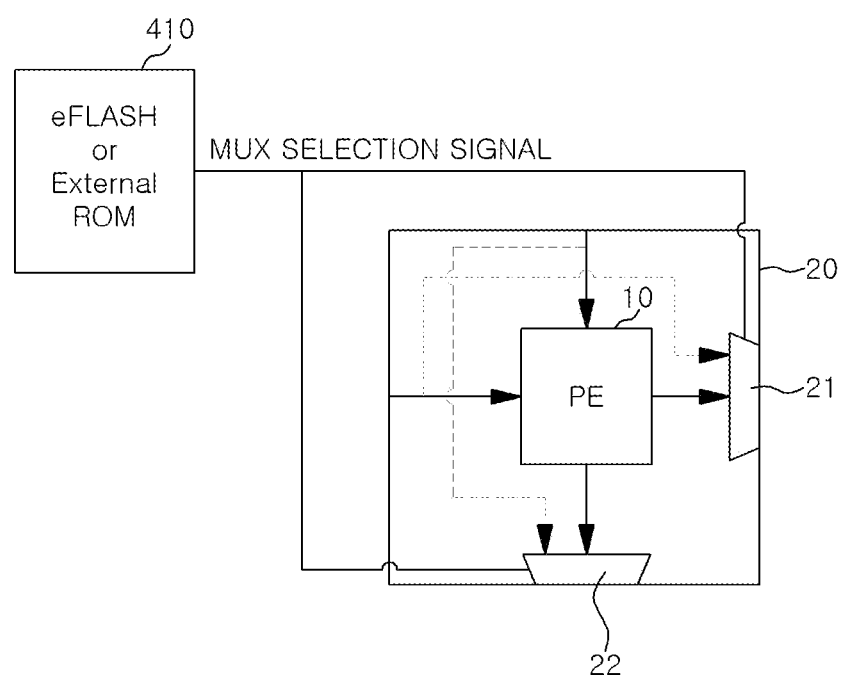
FIG. 3 is a schematic diagram illustrating the processing element according to the first embodiment, a processing unit including the processing element according to the first embodiment, and an e-FLASH or External ROM for controlling the processing unit with being connected with the processing unit according to the first embodiment.

FIG. 3 is a schematic diagram illustrating the processing element 10 according to the first embodiment, the processing unit 20 including the processing element 10 according to the first embodiment, and the e-FLASH or External ROM for controlling the processing unit 20 with being connected with the processing unit 20 according to the first embodiment.

Referring to FIG. 3, the processing unit 20 according to the first embodiment may include the processing element 10 and transfer parts 21, 22, and may be connected to the e-FLASH or External ROM 410 (component included in the control unit 400 of FIG. 1).

The explanation about the processing element 10 cites the part explained in FIG. 2.

Then, each of the transfer parts 21, 22 is configured to transfer one of the followings to the processing unit 20 adjacently arranged on the other side of itself. At this time, the transfer part 21 may be indicated as the first bypass transfer part 21, the transfer part 22 may be indicated as the second bypass transfer part 22, and each of them may be embodied by the multiplexer.

data received from the processing unit 20 arranged on one side of itself the result that the processing element 10 processed and outputted Here, the case that the transfer parts 21, 22 transfer the data received from the processing unit 20 adjacently arranged on one side of itself is the case that there is a fault in the processing element 10. Meanwhile, the case that the transfer parts 21, 22 transfer the result that the processing element 10 processed and outputted is the case that there is no fault in the processing element 10.

The e-FLASH or External ROM 410 may provide the information about whether there is a fault in the processing element 10 to each of the transfer part 21, 22. Here, the information provided by the e-FLASH or External ROM 410 may be acquired through a previous scan test, which will be explained more specifically in FIG. 12 and FIG. 13.

Meanwhile, the number of the transfer parts 21, 22 are illustrated as two in FIG. 3, but it is just an example. According to an embodiment, the number of the transfer part may be one or three or more. For example, the number of the transfer parts 21, 22 may be provided as three in the processing unit 20 for each of the input feature, the weight, and the partial sum.

Figure 4:
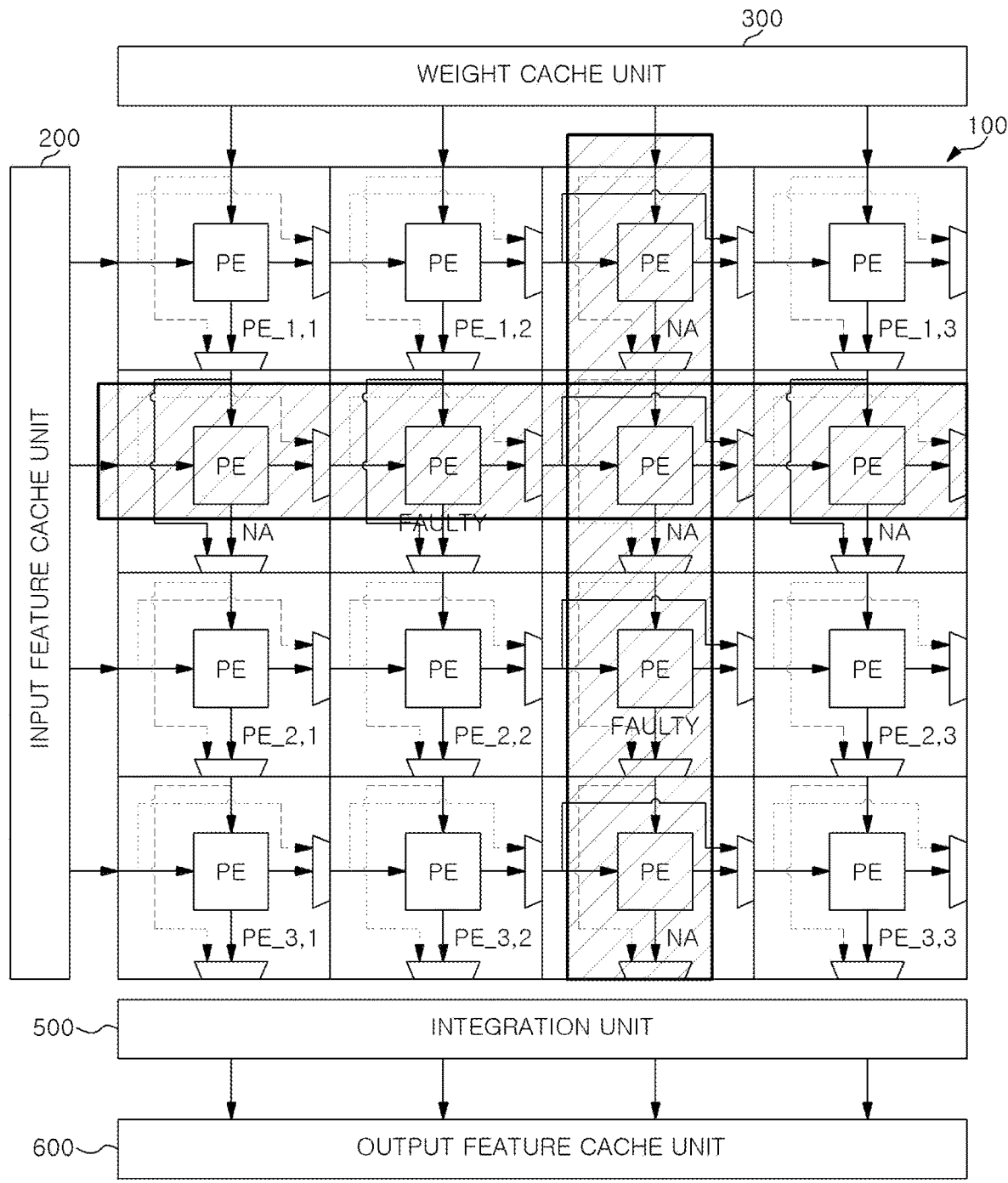
FIG. 4 is a conceptual diagram exemplarily illustrating a case that a systolic array device including the processing unit illustrated in FIG. 3 in a plural number includes a processing unit having a fault.

FIG. 4 is a block diagram illustrating a case that the systolic array device including the processing unit 20 illustrated in FIG. 3 in a plural number includes a processing unit having a fault. Here, the 'processing unit having a fault' may indicate the processing unit including the processing element having the fault. Meanwhile, the case illustrated in FIG. 4 is an example, and the present disclosure is not limited to the illustration of FIG. 4.

In case of FIG. 4, it is conditioned on the systolic array device including nine main processing units in the matrix form of 3 by 3. Further, a preliminary processing unit may be additionally arranged to the 3 by 3 matrix in the form of at least one row or at least one column. FIG. 4 illustrates that the preliminary processing unit is additionally arranged to the 3 by 3 matrix in the form of one row and one column.

If there is no fault in any main processing unit among the nine main processing units, the systolic array device may operate as the processing accelerator by only the nine main processing units. In this case, the preliminary processing unit may not operate as a component of the processing accelerator.

Unlike this, depending upon the case, there may be a fault in at least one main processing unit among the nine main processing units. For example, as illustrated in FIG. 4, two main processing units may have faults. In FIG. 4, 'FAULTY' is illustrated in the processing units having the faults.

In this case, the control unit 400 may identify the information on the two main processing units having the faults among the nine main processing units according to the ways illustrated in FIG. 7 and FIG. 8 (explained later). Based on the identified information, the e-FLASH or External ROM 410 included in the control unit 400 may control the transfer parts 21, 22 included in each of the processing units and make the following operations to be performed.

in each of the processing units included in the same row (or column) with the main processing unit having the fault, it is controlled that the data transferred from the processing unit adjacently arranged on one side to be bypassed to the processing unit adjacently arranged on the other side.

in each of the main processing units having no fault, it is controlled that the result outputted from the processing element included in the corresponding processing unit is transferred to the processing unit adjacently arranged to the same row (or column).

Referring to FIG. 4, the main processing unit arranged in (2, 2) has a fault. Accordingly, the control unit 400 may control each of the processing units in the second row such that the data transferred from each of the processing units adjacently arranged to the first row is bypassed to the processing unit adjacently arranged to the third row. Of course, unlike the illustration of FIG. 4, it is possible to control each of the processing units in the second column in the same way.

Further, referring to FIG. 4, the main processing unit arranged in (3, 3) has a fault. Accordingly, the control unit 400 may control each of the processing units in the third column such that the data transferred from each of the processing units adjacently arranged to the second column is bypassed to the processing unit adjacently arranged to the fourth column. Of course, unlike the illustration of FIG. 4, it is possible to control each of the processing units in the third row in the same way.

Figure 5:
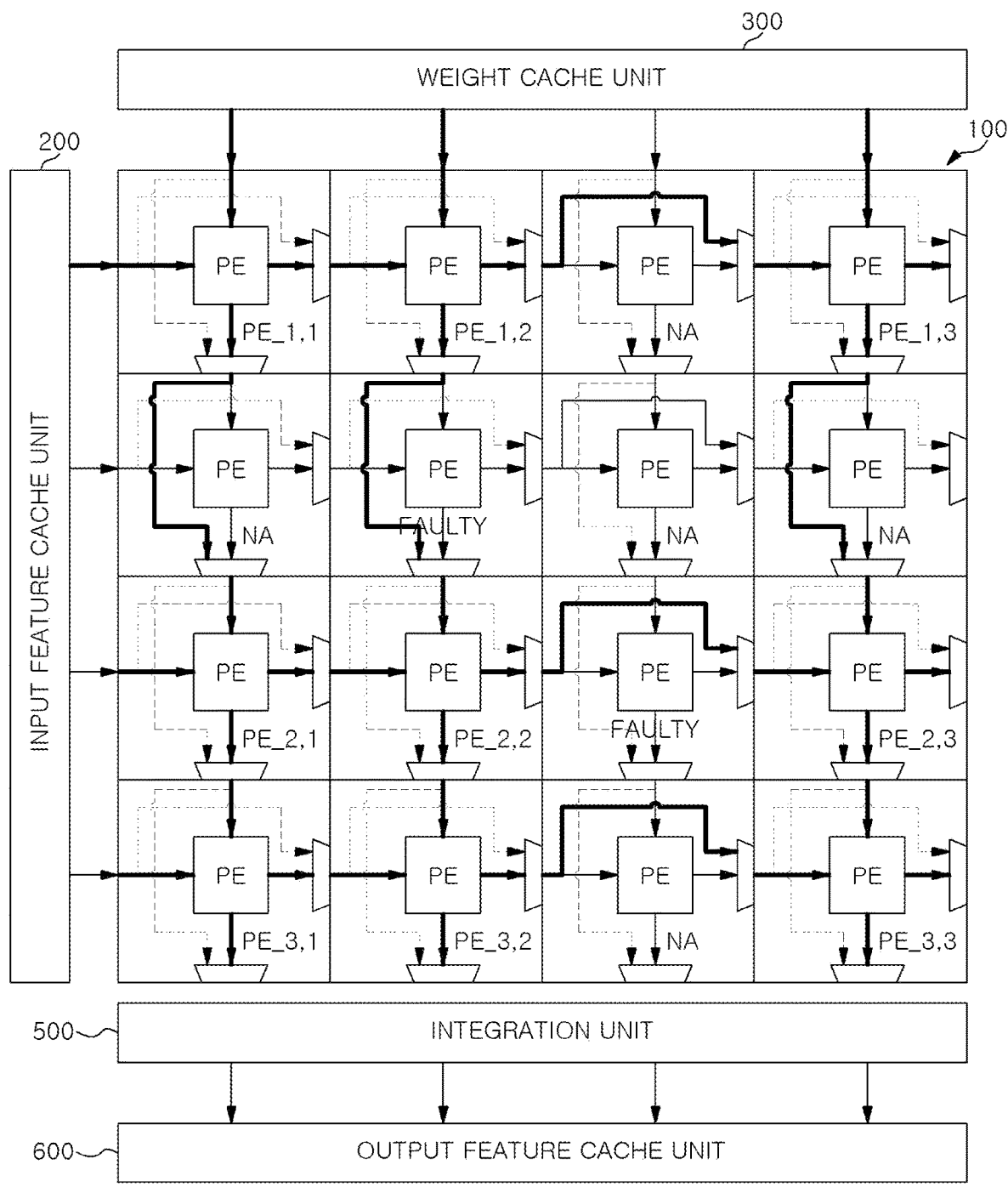
FIG. 5 is a conceptual diagram exemplarily illustrating a data flow in the systolic array device illustrated in FIG. 4.

Based on this, the data flow in the systolic array device 1000 illustrated in FIG. 4 will be explained referring to FIG. 5. FIG. 5 is a block diagram illustrating a data flow in the systolic array device 1000 illustrated in FIG. 4.

After the systolic array device 1000 is manufactured, the bootloader may load the signal for controlling the transfer parts 21 and 22 from the e-FLASH or External ROM 410 included in the control unit 400, and may make the bypass operation to be performed in the processing units in (2, 2) and (3, 3) having the faults. Also, the bootloader may make the bypass operation to be performed in all the processing units in the second row and all the processing units in the third column. The weight cache unit 300 may provide weights to each of the processing units in (1, 1), (1, 2), (1, 4). Further, the input feature cache unit 200 may provide input features to each of the processing units in (1, 1), (3, 1), (4, 1).

Then, the processing unit arranged in (1, 1) may perform the processing using the input feature and the weight, and then, may transfer the partial sum which is a result of the processing and the weight to the processing unit arranged in (2, 1) and transfer the input feature to the processing unit arranged in (1, 2).

Then, the processing unit arranged in (2, 1) may bypass the transferred information to the processing unit arranged in (3, 1). The processing unit arranged in (3, 1) may perform the processing in the same way with the processing unit arranged in (1, 1) and process the processing result.

Meanwhile, the processing unit arranged in (1, 2) may perform the processing in the same way that the processing unit arranged in (1, 1) performed based on the information transferred from the processing unit arranged in (1, 1), and then, may transfer the processing result to the processing unit arranged in (1, 3). Then, the processing unit arranged in (1, 3) may bypass the transferred processing result to the processing unit arranged in (1, 4).

That is, in the first embodiment, even in case that a part of main processing units provided to constitute the systolic array device have faults, the systolic array device may be operated by partially utilizing the preliminary processing unit and the main processing unit having the fault. That is, the systolic array may not be discarded even if one of the main processing unit has the fault. Accordingly, the production yield of the systolic array device may be improved.

Meanwhile, each of the processing units is configured to receive the same synchronizing signal. Through the synchronizing signal, each processing performed in the processing unit is synchronized. For example, a plurality of processing units arranged in the same row (or column) may perform the processing at the same point in time, and transfer the processing result to the next row (or column) at the same timing. At this time, each of the input feature, the weight and the partial sum may be transferred to the adjacent processing unit periodically according to the synchronizing signal. Unlike this, according to an embodiment, the weight may be previously loaded at each processing unit regardless of the synchronizing signal.

Hereinafter, a systolic array device according to a second embodiment of the present disclosure will be explained. The systolic array device according to the second embodiment may have the same configuration with the systolic array device 1000 illustrated in FIG. 1, and may include the processing element 10 having the same configuration with the processing element 10 illustrated in FIG. 2. Thus, in the second embodiment, the parts explained in FIGS. 1 and 2 may be cited, and the difference of the second embodiment compared to the first embodiment will be explained referring to FIGS. 6 to 8.

Figure 6:
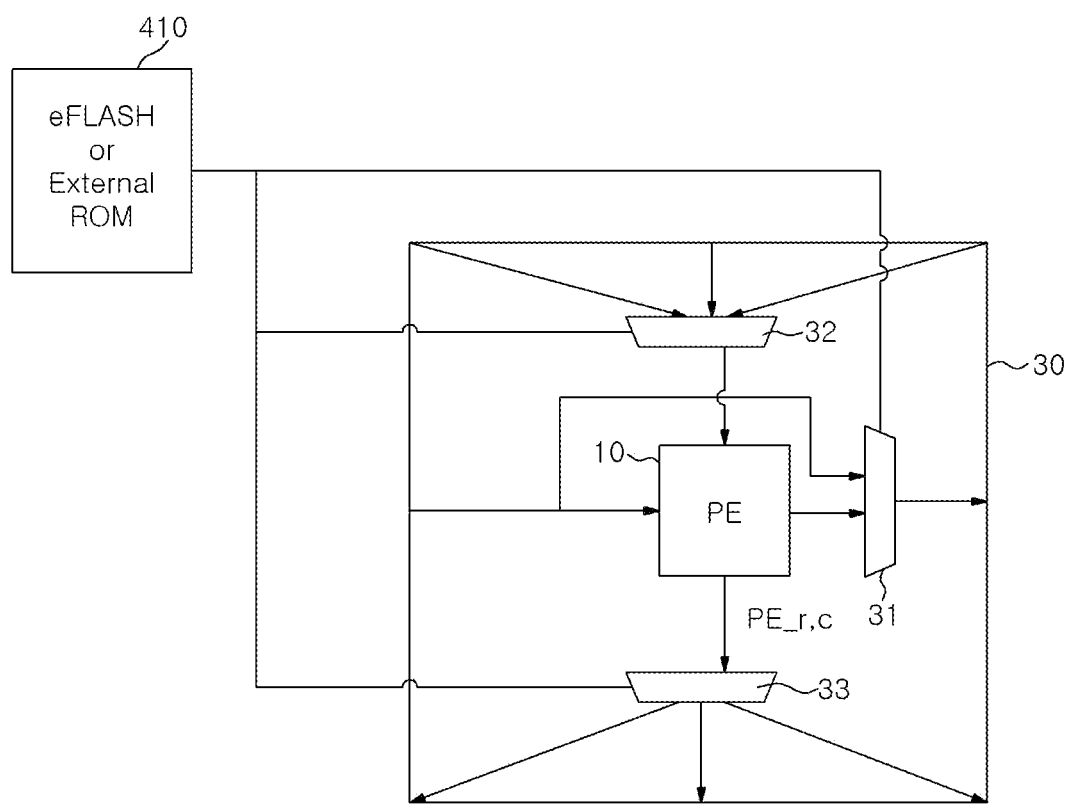
FIG. 6 is a schematic diagram illustrating the processing element according to a second embodiment, the processing unit including the processing element according to the second embodiment, and the e-FLASH or External ROM for controlling the processing unit with being connected with the processing unit according to the second embodiment.

FIG. 6 is a schematic diagram illustrating the processing element 10 according to the second embodiment, the processing unit 30 including the processing element 10 according to the second embodiment, and the e-FLASH or External ROM 410 for controlling the processing unit with being connected with the processing unit 30 according to the second embodiment.

Referring to FIG. 6, the processing unit 30 according to the second embodiment may include the processing element 10 and the transfer parts 31 to 32, and may be connected to the e-FLASH or External ROM 410. Meanwhile, since the configuration illustrated in FIG. 6 is an example, the processing unit 30 may not include at least one of the components illustrated in FIG. 6. Unlike this, the processing unit 30 may include a component that is not illustrated in FIG. 6.

Here, the processing element 10 may receive input of first information (e.g., an input feature) from a first direction (e.g., a column direction) and receive input of second information (e.g., a weight or a partial sum) from a second direction (e.g., a row direction). Then, the processing element 10 may perform the processing based on the input information and output a result.

Then, the transfer parts 31 to 33 may be configured to transfer one of the followings to the processing unit adjacently arranged on the other side of itself, or may configured not to transfer anything. At this time, the transfer part 31 may refer to a bypass transfer part 31, the transfer parts 32, 33 may refer to direction control transfer parts 32 and 33, and each of the transfer parts 31 to 33 may be embodied by the multiplexer.

data received from the processing unit adjacently arranged on one side of itself
   the result that the processing element 10 of itself processed and outputted.

Here, 'the processing unit adjacently arranged on one side of itself' may refer to the processing unit adjacently arranged to the same row (or column) with itself or the processing unit adjacently arranged in the diagonal direction to itself. Further, 'the processing unit adjacently arranged on the other side of itself' may refer to the processing unit adjacently arranged to the same row (or column) with itself or the processing unit adjacently arranged in the diagonal direction to itself.

The e-FLASH or External ROM 410 may be cited to the description explained in the first embodiment.

Meanwhile, the number of the transfer part 31 to 33 are illustrated as three in FIG. 6, but it is just an example and the number of the transfer parts may be provided as two or less, or four or more. For example, the number of the transfer parts 31 to 33 may be provided as one for the input feature, one for receiving each of the weight and the partial sum, and one for transferring each of the weight and the partial sum. Thus, total five (1+2+2) transfer parts may be provided in the processing unit.

Figure 7:
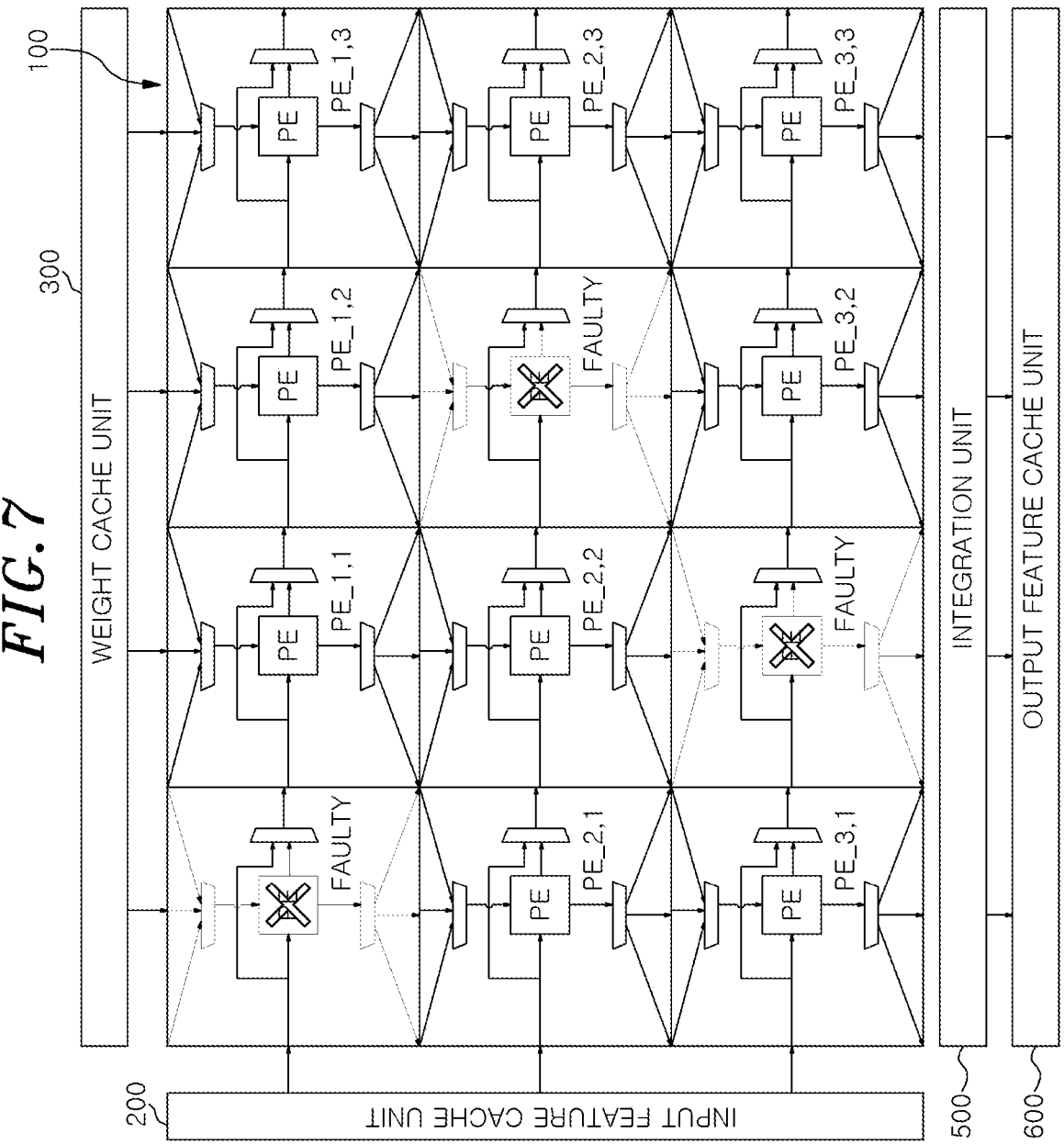
FIG. 7 is a conceptual diagram exemplarily illustrating a case that the systolic array device including the processing unit illustrated in FIG. 6 in a plural number includes a processing unit having a fault.

FIG. 7 is a block diagram illustrating a case that the systolic array device including the processing unit 30 illustrated in FIG. 6 in a plural number includes a processing unit having a fault. Here, the case illustrated in FIG. 7 is an example, and the present disclosure is not limited to the illustration of FIG. 7.

In case of FIG. 7, it is conditioned on the systolic array device including nine main processing units in the matrix form of 3 by 3. Further, a preliminary processing unit may be additionally arranged to the 3 by 3 matrix in the form of at least one row or at least one column. FIG. 7 illustrates that the preliminary processing unit is additionally arranged to the 3 by 3 matrix in the form of one column.

If there is no fault in any main processing unit among the nine main processing units, the systolic array device may operate as the processing accelerator by only the nine main processing units. In this case, the preliminary processing unit may not operate as a component of the processing accelerator.

Unlike this, depending upon the case, there may be a fault in at least one main processing unit among the nine main processing units. For example, as illustrated in FIG. 7, three main processing units may have faults. In FIG. 7, 'FAULTY' is illustrated in the processing units having the faults.

In this case, the control unit 400 may identify the information on the main processing units having the faults among the nine main processing units. Based on the identified information, the e-FLASH or External ROM 410 included in the control unit 400 may control the transfer parts 31 to 33 included in each of the processing units and make the following operations to be performed.

<An Example of the Control Performed by the Bypass Transfer Part 31 in the Processing Unit Having the Fault>
   In the row direction (or column direction), it is controlled such that the data transferred from the processing unit adjacently arranged on one side is bypassed to the processing unit adjacently arranged on the other side <An Example of the Control Performed by the Bypass Transfer Part 31 in the Processing Unit Having No Fault>
   the result outputted from the corresponding processing element 10 is transferred to the processing unit adjacently arranged in the other direction <An Example of the Control Performed by the Direction Control Transfer Part 32 in the Processing Unit Having the Fault>
   no data is provided to the corresponding processing element 10

<An Example of the Control Performed by the Direction Control Transfer Part 32 in the Processing Unit Having No Fault>
   in the column direction (row direction), receiving data from one of the processing unit adjacently arranged in the same row (column) with itself and the processing unit adjacently arranged in the diagonal direction and providing the data to the processing element 10

<An Example of the Control Performed by the Direction Control Transfer Part 33 in the Processing Unit Having the Fault>
   the corresponding processing element 10 does not output any result, and thus, the direction control transfer part 33 does not output any result in the column direction (row direction)

Figure 8:
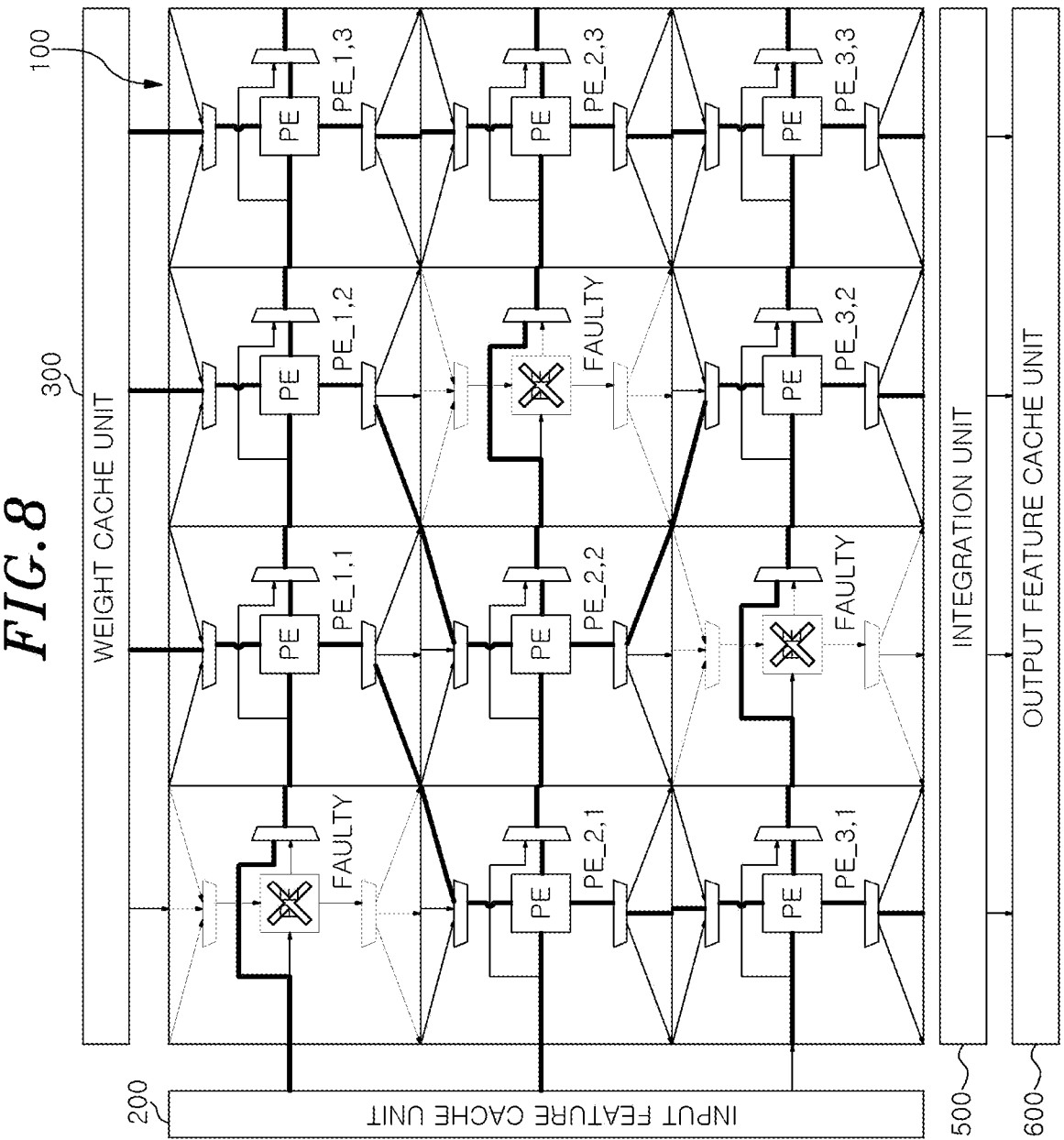
FIG. 8 is a conceptual diagram exemplarily illustrating a data flow in the systolic array device illustrated in FIG. 7.

<An Example of the Control Performed by the Direction Control Transfer Part 33 in the Processing Unit Having No Fault> the result that the corresponding processing element 10 outputted is transferred to one of the processing unit adjacently arranged to the same row (column) with itself in the column direction (row direction) and the processing unit adjacently arranged in the diagonal direction Based on this, referring to FIG. 8, the data flow in the systolic array device 1000 illustrated in FIG. 7 will be explained. FIG. 8 is a block diagram illustrating the data flow in the systolic array device illustrated in FIG. 7.

After the systolic array device 1000 is manufactured, when booting, the bootloader may load the signal for controlling the transfer parts 31 to 33 from the e-FLASH or External ROM 410 included in the control unit 400.

By the signal, in each of the processing units (1, 1), (2, 3) and (3, 2), data transferred from the processing unit adjacently arranged on one side in the row direction is transferred to the processing unit adjacently arranged on the other side, and any data or result is not transferred in the column direction.

Further, by the signal, in each of at least a part of the processing units having no fault, the result that the processing element of itself outputted is transferred to the processing unit adjacently arranged on the other side in the row direction. In the column direction, data is provided from one of the processing unit arranged adjacent to one side of the corresponding processing unit in the same column and the processing units arranged diagonally adjacent to the corresponding processing unit, and the result that the processing element of itself outputted is transferred to one of the processing unit arranged adjacent to the other side of the corresponding processing unit in the same column with itself and the processing units arranged diagonally adjacent to the corresponding processing unit.

For example, referring to FIG. 8, the weight that the weight cache unit 300 transferred to the processing unit (1, 2) is transferred to the processing unit (3,1) through the processing unit (2, 1), the weight that the weight cache unit 300 transferred to the processing unit (1, 3) is transferred to the processing unit (3, 2) through the processing unit (2,2), and the weight that the weight cache unit 300 transferred to the processing unit (1, 4) is transferred to the processing unit (3, 3) through the processing unit (2, 3).

With this, the input feature that the input feature cache unit 200 transferred to the processing unit (1, 1) is transferred to the processing unit (1, 2) by being bypassed immediately, and then is transferred to the processing unit (1, 4) through the processing unit (1, 3). Further, the input feature that the input feature cache unit 200 transferred to the processing unit (2, 1) is transferred to the processing unit (2, 2), and then is transferred to the processing unit (2, 4) by being bypassed in the processing unit (2, 3). Furthermore, the input feature that the input feature cache unit 200 transferred to the processing unit (3, 1) is transferred to the processing unit (3, 3) by being bypassed in the processing unit (3, 2), and then is transferred to the processing unit (3, 4).

That is, in the second embodiment, even in the case that there are faults in a part of the main processing units provided to constitute the systolic array device, the systolic array device may be operated by partially utilizing the preliminary processing unit and the main processing units having the faults. That is, even if there is a fault in any one of the main processing units, the systolic array device needs not to be discarded. Thus, it is possible to improve the production yield of the systolic array device.

Meanwhile, each processing unit is configured to receive the same synchronizing signal. By the synchronizing signal, the processes performed in the processing units are synchronized with each other. For example, a plurality of the processing units arranged in the same row (or column) may perform the processing at the same timing, and may transfer the result of performing the processing to the next row (or column) at the same timing. At this time, each of the input feature and the partial sum may be transferred to the adjacent processing unit periodically according to the synchronizing signal. Unlike this, according to an embodiment of the present disclosure, the weight may be previously loaded at each processing unit regardless of the synchronizing signal.

Hereinafter, a systolic array device according to a third embodiment will be explained. The systolic array device according to the third embodiment may have the same configuration with the systolic array device 1000 illustrated in FIG. 1, and may include the processing element 10 having the same configuration with the processing element 10 illustrated on FIG. 2. Thus, in the third embodiment, the parts explained in FIGS. 1 and 2 may be cited, and the difference of the third embodiment compared to the first embodiment will be explained referring to FIGS. 9 to 11.

Figure 9:
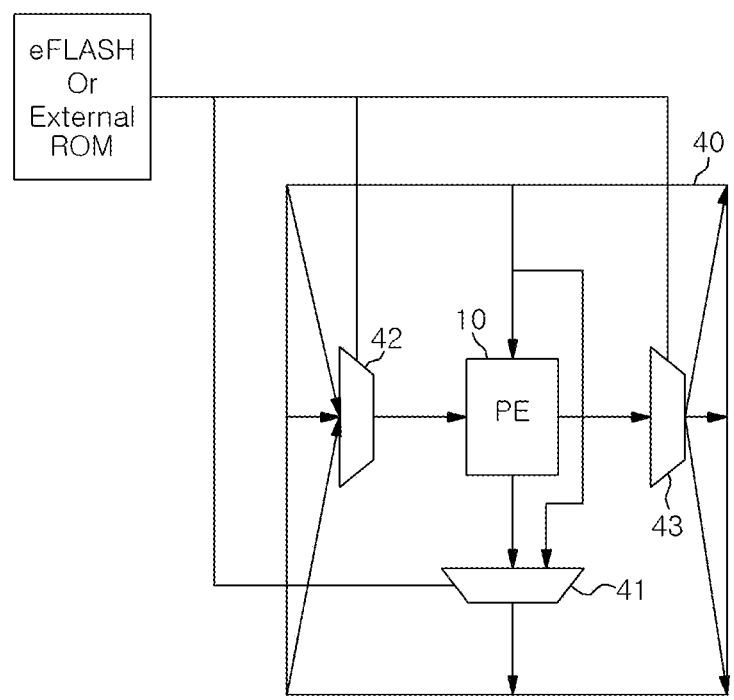
FIG. 9 is a schematic diagram exemplarily illustrating the processing element according to a third embodiment, the processing unit including the processing element according to the third embodiment, and the e-FLASH or External ROM for controlling the processing unit with being connected with the processing unit according to the third embodiment.

FIG. 9 is a schematic diagram illustrating the processing element 10 according to the third embodiment, the processing unit 40 including the processing element 10 according to the third embodiment, and the e-FLASH or External ROM for controlling the processing unit 40 with being connected with the processing unit 40 according to the third embodiment.

Referring to FIG. 9, the processing unit 40 according to the third embodiment may include the processing element 10 and the transfer parts 41 to 43, and may be connected with the e-FLASH or External ROM 410 (a component included in the control unit 400). Meanwhile, since the configuration illustrated in FIG. 9 is an example, the processing unit 40 may not include at least one of the components illustrated in FIG. 9. Unlike this, the processing unit 40 may include a component that is not illustrated in FIG. 9.

Here, the processing element 10 may receive the input of first information (e.g., an input feature) from a first direction (e.g., a column direction), receive the input of second information (e.g., a weight or a partial sum) from a second direction (e.g., a row direction), and then, output a result after performing the process based on the input information.

Then, the transfer parts 41 to 43 may be configured to transfer one of the followings to the processing unit adjacently arranged on the other side of itself, or may be configured not to transfer anything. At this time, the transfer part 41 may refer to the bypass transfer part 41, the transfer parts 42, 43 may refer to direction control transfer parts 42 and 43, and each of the transfer part 41 to 43 may be embodied by the multiplexer.

data received from the processing unit adjacently arranged on one side of itself the result that the processing element 10 of itself processed and outputted Here, 'the processing unit adjacently arranged on one side of itself' may refer to the processing unit adjacently arranged to the same row (or column) with itself or the processing unit adjacently arranged in the diagonal direction to itself. Further, 'the processing unit adjacently arranged on the other side of itself' may refer to the processing unit adjacently arranged to the same row (or column) with itself or the processing unit adjacently arranged in the diagonal direction of itself.

The e-FLASH or External ROM 410 may be cited to the description explained in the first embodiment.

Meanwhile, the number of the transfer part 41 to 43 are illustrated as three in FIG. 9, but it is just an example and the number of the transfer parts may be provided as two or less, or four or more. For example, the number of the transfer parts 41 to 43 may be provided as one for receiving the input feature, one for transferring the input feature, one for bypassing each of the weight and the partial sum. Thus, total four (1+1+1+1) transfer parts may be provided in the processing unit.

Figure 10:
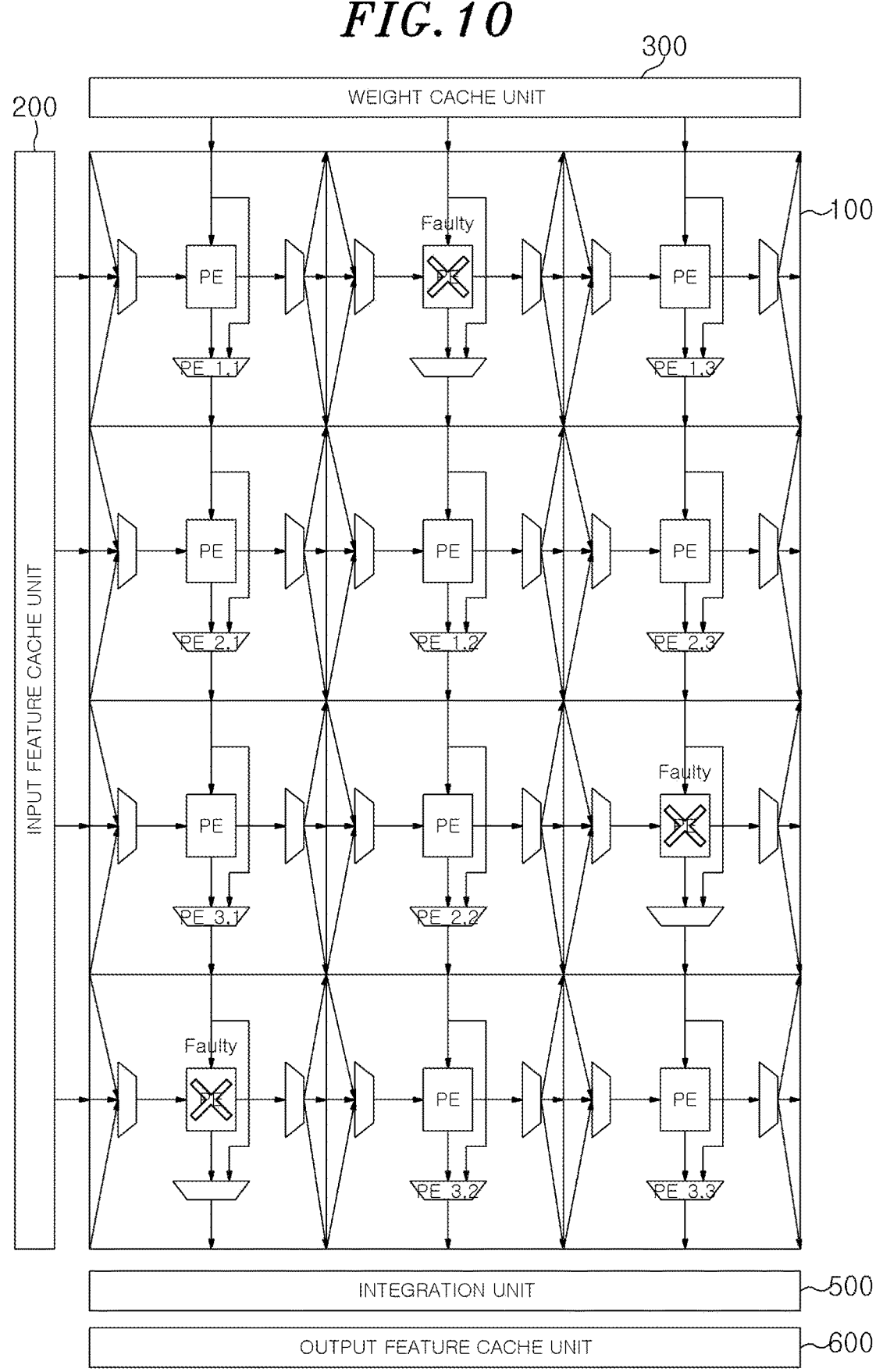
FIG. 10 is a conceptual diagram exemplarily illustrating a case that the systolic array device including the processing unit illustrated in FIG. 9 in a plural number includes a processing unit having a fault.

FIG. 10 is a conceptual diagram illustrating a case that the systolic array device including the processing unit 40 illustrated in FIG. 9 in a plural number includes a processing unit having a fault. Here, the case illustrated in FIG. 10 is an example, and the present disclosure is not limited to the illustration of FIG. 10.

In FIG. 10, it is conditioned on the systolic array device including nine main processing units in the matrix form of 3 by 3. Further, a preliminary processing unit may be additionally arranged to the 3 by 3 matrix in the form of at least one row or at least one column. FIG. 10 illustrates that the preliminary processing unit is additionally arranged to the 3 by 3 matrix in the form of one row.

If there is no fault in any main processing unit among the nine main processing units, the systolic array device may operate as the processing accelerator by only the nine main processing units. In this case, the preliminary processing unit may not operate as a component of the processing accelerator.

Unlike this, depending upon the case, there may be a fault in at least one main processing unit among the nine main processing units. For example, as illustrated in FIG. 10, three main processing units may have faults. In FIG. 10, 'FAULTY' is illustrated in the processing units having the faults.

In this case, the control unit 400 may identify the information on the main processing units having the faults among the nine main processing units. Based on the identified information, the e-FLASH or External ROM 410 included in the control unit 400 may control the transfer parts 41 to 43 included in each of the processing units and make the following operations to be performed.

<An Example of the Control Performed by the Bypass Transfer Part 41 in the Processing Unit Having the Fault>
  In the row direction (or column direction), it is controlled such that the data transferred from the processing unit adjacently arranged on one side is bypassed to the processing unit adjacently arranged on the other side <An Example of the Control Performed by the Bypass Transfer Part 41 in the Processing Unit Having No Fault>
  the result outputted from the corresponding processing element 10 is transferred to the processing unit adjacently arranged in the other direction <An Example of the Control Performed by the Direction Control Transfer Part 42 in the Processing Unit Having the Fault>
  no data is provided to the corresponding processing element 10

<An Example of the Control Performed by the Direction Control Transfer Part 42 in the Processing Unit Having No Fault>
  in the column direction (row direction), receiving data from one of the processing unit adjacently arranged to the same row (column) with itself and the processing unit adjacently arranged in the diagonal direction to provide the data to the processing element 10

<An Example of the Control Performed by the Direction Control Transfer Part 43 in the Processing Unit Having the Fault>
  the corresponding processing element 10 does not output any result, and thus, the direction control transfer part 43 does not output any result in the column direction (row direction)

Figure 11:
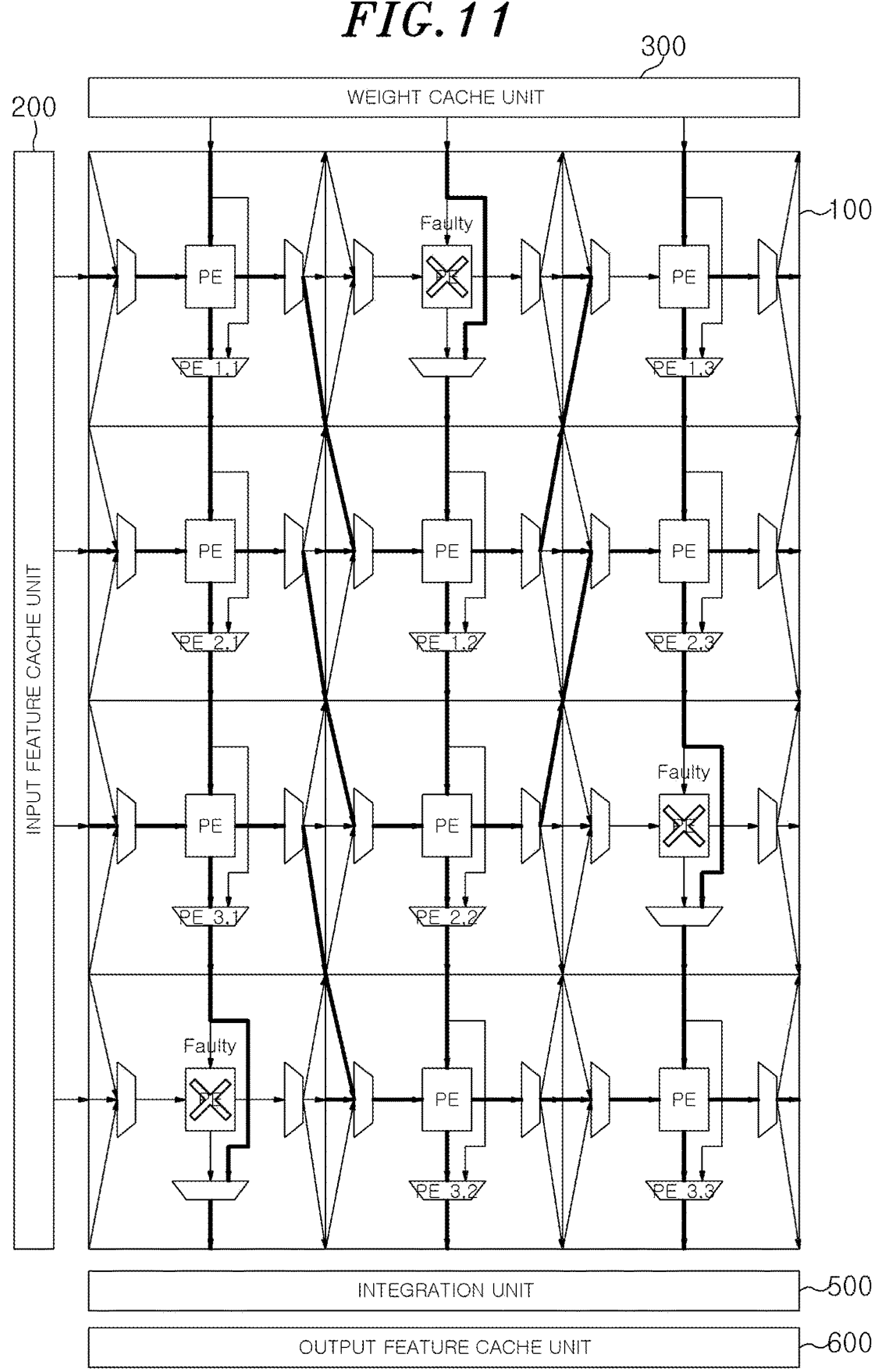
FIG. 11 is a conceptual diagram exemplarily illustrating a data flow in the systolic array device illustrated in FIG. 10.

<An Example of the Control Performed by the Direction Control Transfer Part 43 in the Processing Unit Having No Fault>
  the result that the corresponding processing element 10 outputted is transferred to one of the processing unit adjacently arranged to the same row (column) with itself in the column direction (row direction) and the processing unit adjacently arranged in the diagonal direction Based on this, referring to FIG. 11, the data flow in the systolic array device 1000 illustrated in FIG. 10 will be explained. FIG. 11 is a block diagram illustrating the data flow in the systolic array device 1000 illustrated in FIG. 10.

After the systolic array device 1000 is manufactured, when booting, the bootloader may load the signal for controlling the transfer parts 41 to 43 from the e-FLASH or External ROM 410 included in the control unit 400.

By the signal, in each of the processing units (4, 1), (1, 2) and (3, 3), data transferred from the processing unit arranged adjacent to one side of the corresponding processing unit in the column direction is transferred to the processing unit arranged adjacent to the other side of the corresponding processing unit in the column direction, and any data or result is neither received nor delivered in the row direction.

Further, by the signal, in each of at least a part of the processing units having no fault, the result that the processing element of itself outputted is transferred to the processing unit adjacently arranged on the other side in the column direction. In the row direction, data is provided from one of the processing unit arranged adjacent to one side of the corresponding processing unit in the same row and the processing units arranged diagonally adjacent to the corresponding processing unit, and the result that the processing element of itself outputted is transferred to one of the processing unit arranged adjacent to the other side of the corresponding processing unit in the same row with itself and the processing units arranged diagonally adjacent to the corresponding processing unit.

For example, referring to FIG. 11, the weight that the weight cache unit 300 transferred to the processing unit (1, 1) is transferred to the processing unit (3, 1) through the processing unit (2, 1), and then, bypassed to the processing unit (4, 1). Further, the weight that the weight cache unit 300 transferred to the processing unit (1, 2) is transferred to the processing unit (2, 2) by being bypassed, and then, transferred to the processing unit (4, 2) through the processing unit (3, 2). Further, the weight that the weight cache unit 300 transferred to the processing unit (1, 3) is transferred to the processing unit (2, 3), and then, transferred to the processing unit (4, 3) by being bypassed in the processing unit (3, 3).

With this, the input feature that the input feature cache unit 200 transferred to the processing unit (1, 1) is transferred to the processing unit (1, 2), and then is transferred to the processing unit (1, 3). Further, the input feature that the input feature cache unit 200 transferred to the processing unit (2, 1) is transferred to the processing unit (3, 2), and then is transferred to the processing unit (2, 3). Further, the input feature that the input feature cache unit 200 transferred to the processing unit (3, 1) is transferred to the processing unit (4, 2), and then is transferred to the processing unit (4, 3).

That is, in the third embodiment, even in the case that there are faults in a part of the main processing units provided to constitute the systolic array device, the systolic array device may be operated by partially utilizing the preliminary processing unit and the main processing units having the faults. That is, even if there is a fault in any one of the main processing units, the systolic array device needs not to be discarded. Thus, it is possible to improve the production yield of the systolic array device.

Meanwhile, each processing unit is configured to receive the same synchronizing signal. By the synchronizing signal, the processes performed in the processing units are synchronized with each other. For example, a plurality of the processing units arranged in the same row (or column) may perform the processing at the same timing, and may transfer the result of performing the processing to the next row (or column) at the same timing. At this time, each of the input feature and the partial sum may be transferred to the adjacent processing unit periodically according to the synchronizing signal. Unlike this, according to an embodiment of the present disclosure, the weight may be previously loaded at each processing unit regardless of the synchronizing signal.

Figure 12:
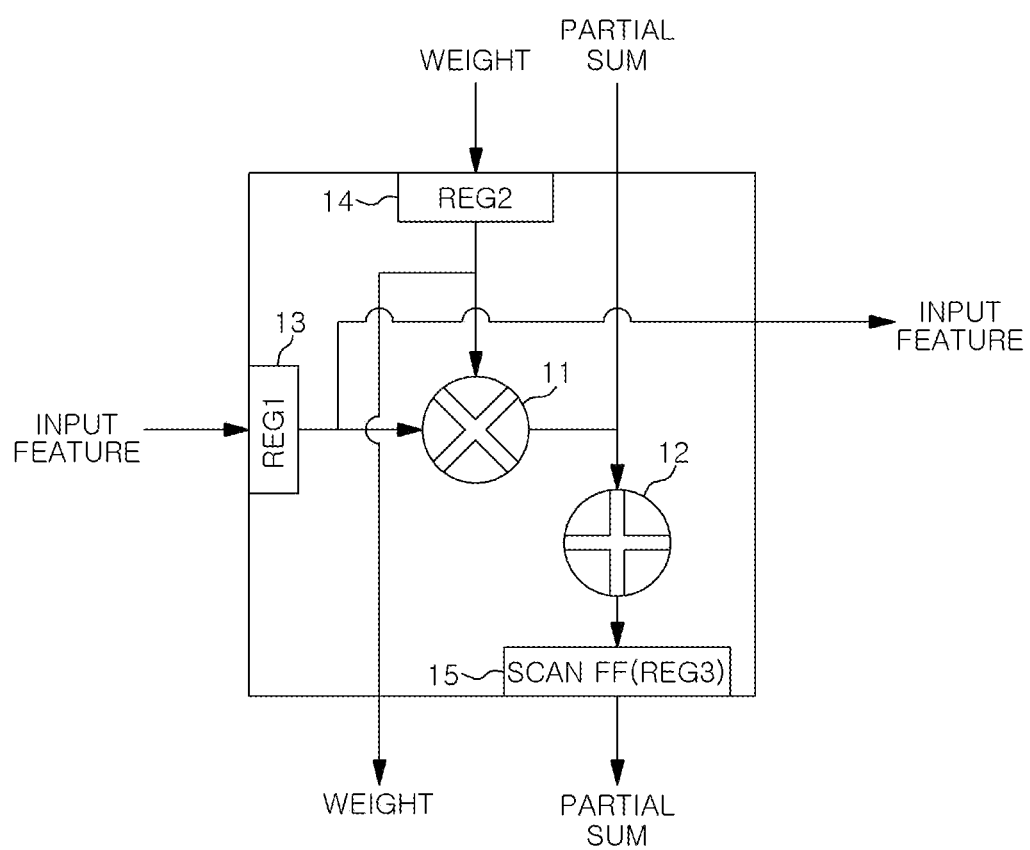
FIG. 12 is a schematic diagram illustrating a processing element having a structure for scanning the fault.

Meanwhile, FIG. 12 is an exemplary diagram regarding the configuration that may be included in the processing element 10 to acquire the control signal from the e-FLASH or External ROM 410. Referring to FIG. 12, unlike FIG. 2, the SCAN FF (flip flop) 15 is included instead of the REG3 15. Here, the SCAN FF 15 may be added instead of the REG3 15, i.e., the register for storing the partial sum.

Figure 13:
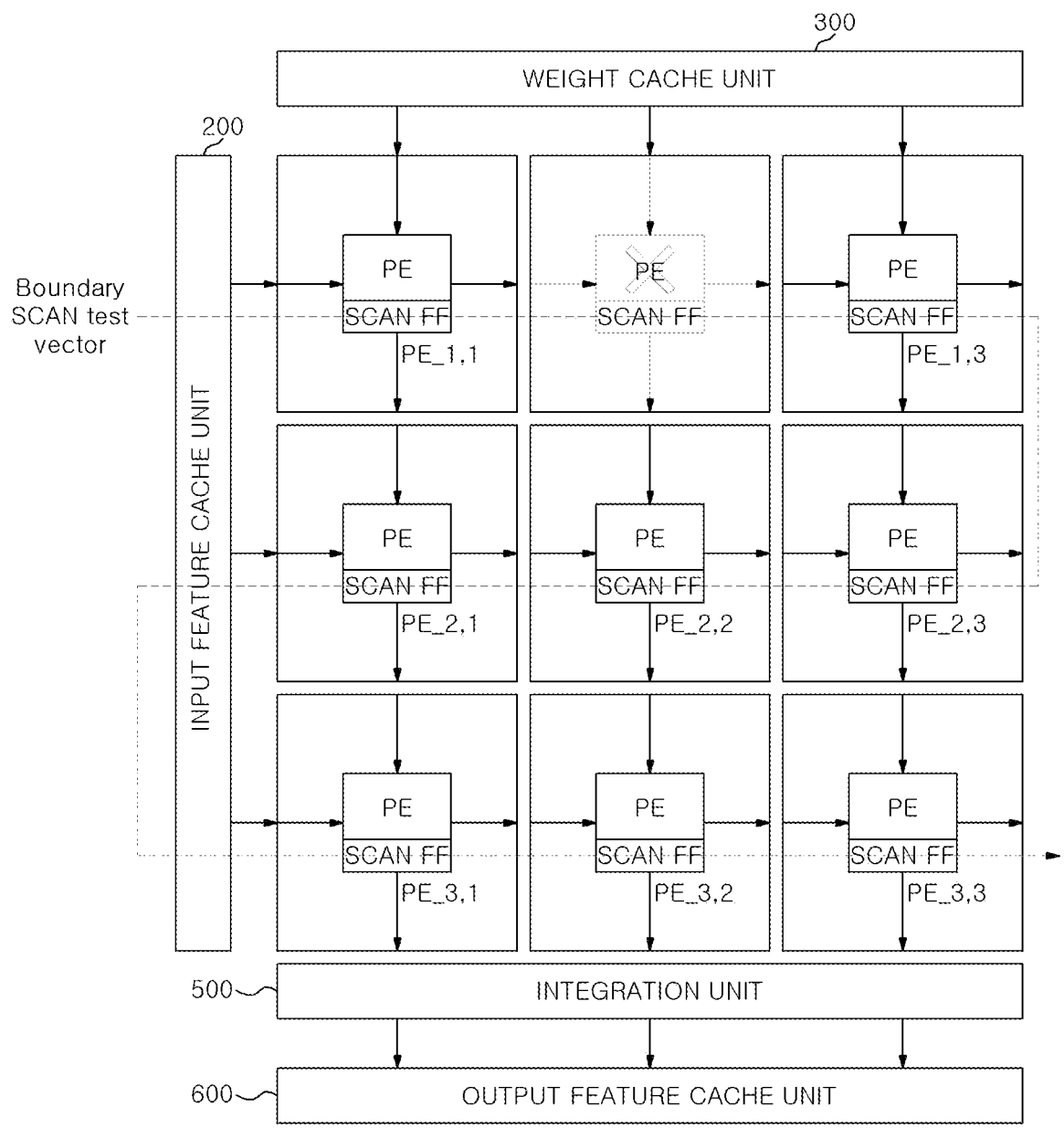
FIG. 13 is a conceptual diagram illustrating a way for scanning the processing unit having the fault according to one embodiment of the present disclosure.

Then, as illustrated in FIG. 13, only the SCAN FFs 15 are entangled with a chain. If a boundary SCAN test vector is given according to this chain, it is possible to confirm that which processing element 10 or the processing unit has the fault through the result value. Accordingly, it is possible to achieve the effect of area reduction. The above description illustrates the technical idea of the present disclosure, and it will be understood by those skilled in the art to which this present disclosure belongs that various changes and modifications may be made without departing from the scope of the essential characteristics of the present disclosure. Therefore, the exemplary embodiments disclosed herein are not used to limit the technical idea of the present disclosure, but to explain the present disclosure, and the scope of the technical idea of the present disclosure is not limited by those embodiments. Therefore, the scope of protection of the present disclosure should be construed as defined in the following claims, and all technical ideas that fall within the technical idea of the present disclosure are intended to be embraced by the scope of the claims of the present disclosure Embodiments of the present disclosure is advantageous, among other reasons, because the production yield of the systolic array device may be improved.

What is claimed is:

1. A systolic array device comprising:
   a plurality of processing units arranged in a matrix form of M by N, where M and N are natural numbers,
   a memory storing fault information indicating presence of faults in processing elements of a plurality of processing units; and
   wherein each of a first subset of the plurality of processing units includes:
   a processing element configured to receive a first input data from one processing unit adjacent to each of the first subset of the plurality of processing units in a first direction and a second input data from another processing unit adjacent to each of the first subset of the plurality of processing units in a second direction different from the first direction, perform a predetermined processing on the second input data using the first input data, and generate a result;
   one or more first multiplexers configured to receive the result and the first input data, the one or more first multiplexers configured to selectively output, (i) the result in response to receiving a signal from the memory indicating that a fault is not present in the processing element or (ii) the first input data in response to receiving another signal from the memory indicating that the fault is present in the processing element; and
   one or more second multiplexers configured to receive the result and the second input data, the one or more second multiplexers configured to selectively output, (i) the result in response to receiving the signal or (ii) the second input data in response to receiving the other signal;
   wherein the plurality of processing units include:
   a main processing unit containing a second subset of the plurality of processing units arranged in a matrix form of P by Q, where P is a natural number equal to or smaller than M, Q is a natural number equal to or smaller than N, and a sum of P and Q is smaller than a sum of M and N; and
   a preliminary processing unit containing at least one row or column of the processing units added to the second subset of the plurality of processing units, one or more of the each of the plurality of processing units in the preliminary unit replacing one or more of the each of the plurality of processing units in the main processing unit in response to determining that the one or more of the each of the plurality of processing units in the main processing unit are faulty.

2. The systolic array device of claim 1, wherein the first input data comprises a weight, and a partial sum generated as an output result of the first processing unit, and
   wherein the one or more first multiplexers include a first multiplexer for the weight, and a second multiplexer for the partial sum.

3. The systolic array device of claim 1, wherein the one or more first multiplexers are configured to receive data from one among the plurality of processing units adjacent to each of the first subset of the plurality of processing units in a same column and processing units diagonally adjacent to each of the first subset of the plurality of processing units, and to transfer the received data to another one of the plurality of processing units.

4. The systolic array device of claim 1, wherein the one or more second multiplexers are configured to receive data from one among the plurality of processing units adjacent to each of the first subset of the plurality of processing units in a same row and processing units diagonally adjacent to each of the first subset of the plurality of processing units, and to transfer the received data to another one of the plurality of processing units.

\* \* \* \* \*